April 15, 1952  W. C. STEINMETZ  2,593,069
METHOD OF MAKING ONE-PIECE IDLER ROLLERS
Filed April 2, 1949  2 SHEETS—SHEET 1

INVENTOR;
WALTER C. STEINMETZ,
BY
ATT'Y.

April 15, 1952  W. C. STEINMETZ  2,593,069
METHOD OF MAKING ONE-PIECE IDLER ROLLERS
Filed April 2, 1949  2 SHEETS—SHEET 2

INVENTOR;
WALTER C. STEINMETZ,
BY
ATT'Y.

Patented Apr. 15, 1952

2,593,069

UNITED STATES PATENT OFFICE 2,593,069

METHOD OF MAKING ONE-PIECE IDLER ROLLERS

Walter C. Steinmetz, Columbus, Ohio, assignor to The Jeffrey Manufacturing Company, a corporation of Ohio Application April 2, 1949, Serial No. 85,152

1 Claim. (Cl. 29—148.4)

This invention relates to a one piece idler roll or roller which is substantially entirely of wrought steel, and to a method of making such a roller.

An object of the invention therefore is to provide an improved method of making a one piece idler roller which is made entirely or substantially entirely of wrought steel and is preferably devoid of any weldments unless the roller is made of welded tubing, which type of tubing as well as seamless tubing may be employed in the making of such rollers.

A more specific object of the invention is to provide such a one piece roller, substantially all of wrought steel, in which the end heads are formed by a method involving deflecting the free ends of a cylindrical tubular wrought steel pipe or pipe stock, so as to deflect said free ends inwardly, thereby providing a generally smooth curved peripheral portion for each head where it merges into the cylindrical body of the idler roll, the heads being concave or of generally frusto conical configuration, with the curved peripheral portions extending over an arc preferably greater than 90 degrees but not substantially greater and preferably less than 180 degrees. Each of the heads also includes an axial generally cylindrical portion providing a female cylindrical surface adapted to receive the outer race or casing of a bearing, said cylindrical portion being radially and axially within the confines of the cylindrical body portion and concentric therewith, and the free edge of each said cylindrical portion being on the axially inner end thereof and including metal which was originally on a free end of the tube or pipe stock from which the roller was formed.

Another object of the invention is to provide an improved method of making a one piece idler roller substantially entirely of wrought steel having the characteristics above set forth.

Other objects of the invention will appear hereinafter, the novel features and combinations being set forth in the appended claim.

In the accompanying drawings.

Idlers rollers for belt conveyors and the like have been made in numerous ways. One of the most acceptable ways is to form the idler roller into a one piece unit. Heretofore one of the cheapest and most satisfactory ways to do this was to cut the roller body from a desired length of cylindrical tubing or tube stock which is essentially wrought steel, being either seamless tubing which is punched from a billet, or welded tubing which is made by curving a steel plate and welding the edges. To this roller body end heads were welded by weldments adjacent the periphery of the heads and opposite edges of the cylindrical body.

While some attempts have been made to form idler rolls by deflecting the ends of tubular stock, the results previously accomplished have not produced the desired form of idler roll or they have been generally too expensive to be commercially acceptable on a large scale.

The idler roller of my invention has been found to be less expensive to manufacture than those heretofore manufactured by the welding process and they have eliminated certain undesirable characteristics of the welded idler rollers, particularly the rough edges thereof and the necessity for grinding and the like.

Figure 1:
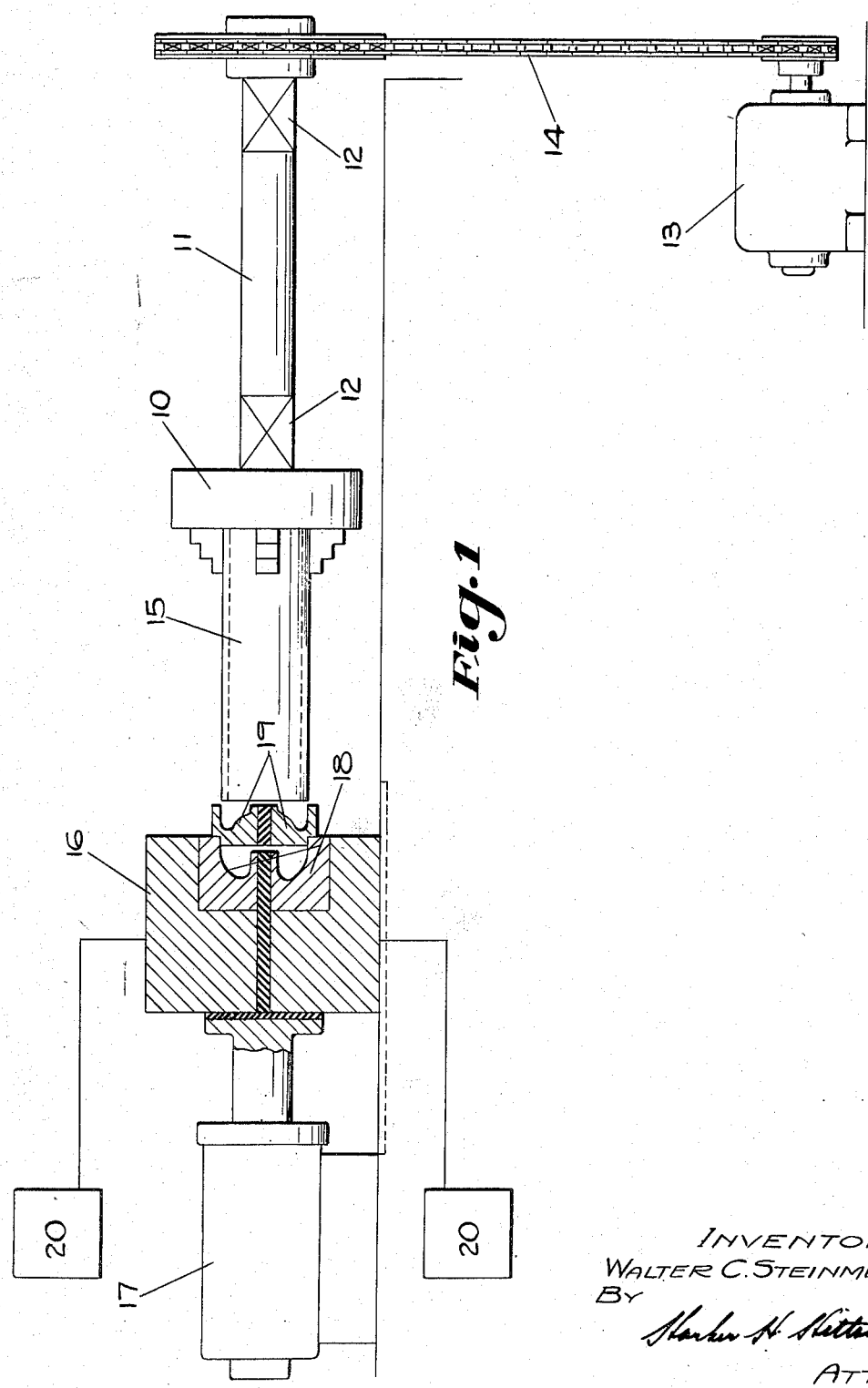
Fig. 1 is a somewhat diagrammatic elevational and sectional view showing apparatus capable of forming the idler rollers of my invention from a section or piece of cylindrical tubing which may be of commercial tubing stock.

Attention is directed to Fig. 1 of the drawings wherein there is illustrated in outline apparatus for carrying out the improved method of forming idler rollers of my invention, in the process of which the improved idler roller is produced. Said idler roller may be produced on a machine which includes a standard chuck 10 carried on a rotatable shaft 11 and mounted on appropriate bearings 12. The chuck 10 and shaft 11 may be rotated from a motor 13 by any conventional drive 14. In carrying out the operation the chuck 10 and shaft 11 are preferably rotated at a speed of approximately 178 R. P. M. This is, of course, purely illustrative.

To make an idler roller a piece of cylindrical tubing or tube stock 15 is cut to a desired length which is in excess of the overall length of the ultimate roller. Any standard type of commercial wrought steel tubing or tube stock may be employed which is reasonably accurate as to size and a true conformation to a cylinder. For example, the tubing 15 may be of commercial seamless wrought steel or it may be welded steel tubing.

It is to be specifically understood that in the claim where reference is made to the fact that the cylindrical body of the idler roller is substantially entirely of wrought steel, this is to embrace a body of wrought steel of the welded seam type. In this regard, it is to be understood that in the metallurgical field steel can either be classified as wrought or cast. A weldment such as that by which the two seams of a welded tube are formed, is actually a casting. That is, cast steel is formed by the molten metal freezing and joining the adjacent edges of wrought steel. Likewise, where in the prior idler rolls the heads or end bells had their peripheries welded to the free edges of the tubular cylindrical body, said heads and body were joined by a ring of cast steel. That is, the weldment at each end was a cast steel ring which joined the wrought steel cylindrical body with the wrought steel head.

It is also to be understood that in the claims where reference is made to the fact that the heads are integrally connected to the cylindrical body member either entirely or substantially entirely by wrought steel, this is to distinguish from the welding or cast steel connection above described.

Reverting to the description of Fig. 1, in the formation of the idler roller the pipe or tubing 15 which has been cut to desired length is held in the chuck 10 and rotated at a relatively slow speed. The left-hand free end of the pipe or tubing 15, is then deflected, preferably successively by two dies, in the following manner. The main frame of the machine, of which the chuck 10 and shaft 11 are a part, slidably supports a split non-rotary die holder 16 which may be reciprocated by a hydraulic cylinder or ram 17 controlled in any well known manner. The die holder 16 is adapted to receive a split die 18 which in turn may removably receive a second split die 19. If desired, the second split die 19, instead of being received by the split die 18, may by received directly by the die holder 16. The two parts of the die holder 16 are connected to individual terminals of a transformer 20. The two parts of the split dies 18 and 19 are individually connected over obvious paths to the two parts of the die holder 16.

To perform the initial deflection of the opposite free ends of the tube 15 the die 19 is removed and an electrical voltage is applied to the two parts of the die holder 16 and consequently to the two parts of the die 18. With the tube 15 rotating as aforesaid, the die holder 16 and die 18 are fed inwardly or to the right, as viewed in Fig. 1. Upon the adjacent free end of the tube 15 contacting the two electrodes provided by the die 18, said free end of the tube 15 will be heated by electrical conduction. This heated free end of the tube 15 will then be deflected by the continued feeding inward of the die 18 so that the original free edge of the pipe or tube 15 will be deflected radially and axially inward of the remaining cylindrical body of the idler roller, with the free edge of the thus formed inner cylindrical body portion located axially and radially inside the main body of the ultimate idler roller.

Figure 2:
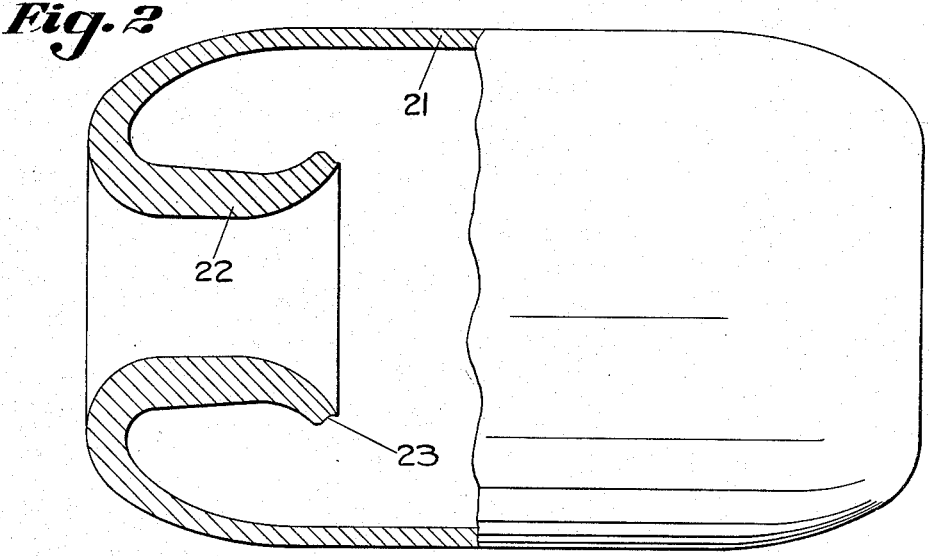
Fig. 2 is a combination sectional and elevational view showing the one piece idler roller in its first stages of formation where it is formed in two stages on two successive dies.

This is best seen by reference to Fig. 2 of the drawings which shows the construction of the idler after it has had the first operation performed on both ends. As here illustrated, the main generally cylindrical body part of the idler roller is designated 21. The free ends of the original tube 15 have been deflected inwardly to provide an integral cylindrical portion or body 22 which has a generally cylindrical female surface which together with the cylindrical portion 22 is concentric with the body 21 and is radially and axially inside the radial and axial dimensions of said tubular roller body.

In addition, it is to be noted that the free continuous edge 23 of said cylindrical portion 22 is on its axial inner end so that the two free continuous edges 23 are on the insides rather than the outsides of the cylindrical portions 22. It is, of course, evident that these free edges 23 contain largely the material which originally was the free edges of the pipe or tube 15 from which the idler roller was formed.

Figure 3:
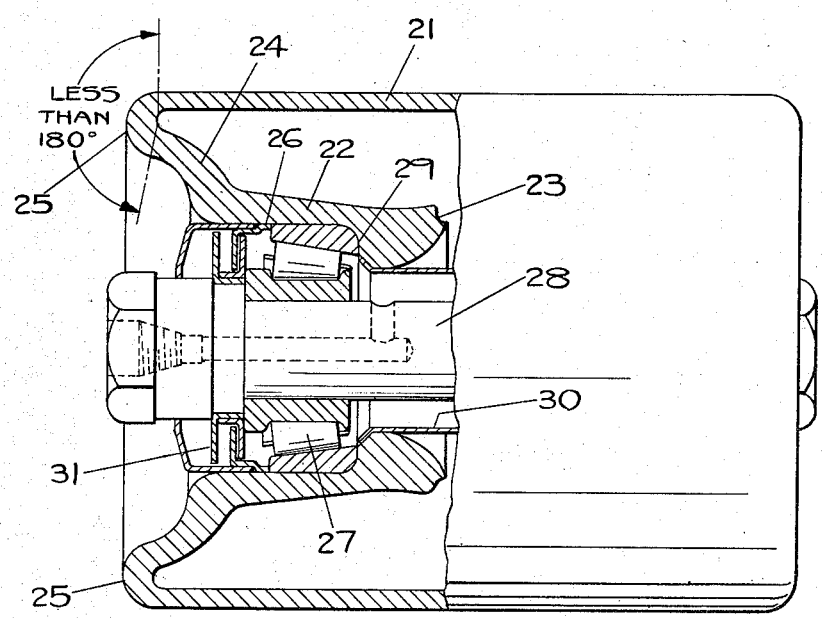
Fig. 3 is a combination sectional and elevational view showing the finished idler roller and associated supporting shaft and bearing at one end thereof.

After the first die forming operation has been performed on the opposite ends of the tube 15 so that the idler roller has the general configuration of Fig. 2, the die 19 is put in place in the die 18, or, if desired, is substituted therefor, and the operation again performed preferably while the parts associated with the die 19 are being heated by conductive heating, as above described, so as to form more distinct heads 24 adjacent the opposite ends of the body 21 and also to improve the general female cylindrical surface of the portions 22, as illustrated in Fig. 3 of the drawings.

In this operation the heads or end bells 24 are generally concave or frusto conical shaped, in which the heads slope radially inwardly from their curved outer portions or peripheries, which may be considered the curved portions designated 25 in Fig. 3 of the drawings, where the cylindrical edges of the body 21 converge by smooth curves into the heads 24. As illustrated in Fig. 3 of the drawings, the arc of this curved integral connection between the heads 24 and the body 21 preferably extends over an angle which is slightly less than 180 degrees but is preferably greater than 90 degrees. In other words, there is at least some convexness in the heads 24.

The inner female cylindrical surface 26 of the cylindrical portion 22 is more accurately formed by the final die 19 so as to receive an anti-friction bearing 27 by which the idler is supported on a dead shaft 28. It may be necessary to machine this cylindrical surface 26. In any event, in its final form the cylindrical portion 22 provides a cup for receiving the anti-friction bearing 27, the outer race of which preferably has a tight or press fit with said cylindrical surface 26. The cup 22 also provides a circumferential bearing retaining ledge 29 adjacent its inner end which abuts the outer race of the bearing 27, thus determining its inward position therein.

Extending between the free edges of the two cups 22 there is a grease retaining tube 30 which is not considered as a part of the one piece idler roller, it being considered as merely auxiliary thereto in the complete idler assembly. A grease seal 31 is preferably also provided adjacent the outer or open portion of the cup 22 to protect the bearing 27.

In some instances, instead of the split die 19, a one piece die may be employed to effect the final shaping of the body 21 and associated heads or end bells 24, as seen in Fig. 3 of the drawings as compared with Fig. 2. In this case no electric heating current is supplied and the second die forming operation is performed while the parts to be deformed are still hot from the previous heating operation which took place while split die 18 was employed. In other words, the idler roller being formed is sufficiently hot so that the final shaping and deforming may be effected by a one piece die 19 without the simultaneous application of external heat by electric current or otherwise.

Certain important characteristics of the one piece idler roller and the method of making it, as embodied in the claims in different aspects thereof, may well be reviewed. First of all, the one piece idler roller is substantially entirely of wrought steel. This is to be understood as meaning that there is no cast steel in the form of weldments or otherwise employed in connecting the heads or end bells 24 with the cylindrical body portion 21. It does not, however, exclude the presence of such cast steel as may be present in the formation of original pipe or tube 15 by the welded seam process. The cup or cylindrical portion 22 is, of course, an integral part of the head 24 and both of them are integral with the body 21, all three of said parts 22, 24 and 21 being formed of material which was originally contained in the pipe or tube 15, no material of any kind being added to that of said pipe or tube 15 either by welding or otherwise. In other words, the complete one piece idler roller is substantially completely formed of wrought steel. Cups 22 are also of continuous material circumferentially. The smooth curve portions 25 by which the ends of the cylindrical body portion 21 of the idler merge into the peripheries of the heads 24 preferably are smoothly curved along arcs of circles of at least 90 degrees and slightly less than 180 degrees, thereby insuring the concave construction of the heads 24, or a generally frusto conical construction in which the heads slope radially inwardly.

Each cylindrical portion or cup 22 is generally concentric with the cylindrical body portion 21 and has a female cylindrical surface 26 adapted to receive a bearing 27 and a seal 31. It also provides a shoulder against which the inner edge of the outer race of bearing 27 abuts. The free continuous edge 23 of each cup or cylindrical portion 22 is on its axial inner end and this portion includes metal which was originally on the free edge of the pipe or tube 15.

It is thus seen that a very strong, efficient, yet relatively inexpensive, idler roller has been produced, in which there are no weldments between the cylindrical body portion and the end heads or bells. Furthermore, the cup or cylindrical portion of each end head or bell 24 is formed by bending or deflecting the original free end of the tube or pipe 15 through, roughly, 180 degrees as viewed in cross section. In other words, the maximum bending of the material is less than 180 degrees at any point and there is only one such 180 degree bend. For example, the final bend between the concave portion of the head 24 proper and the cup portion 22 is generally of an order of less than 90 degrees. This makes for a very strong construction of the entire idler roller.

In the method illustrated, the idler roller is formed by two successive dies which fundamentally operate in substantially the same way. It is to be understood to be within the scope of my invention in its broader aspects to perform the bending head forming operation by a single die, though practice indicates that in the preferred method the operation is done in two stages by two dies as described.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

The method of making a one piece conveyer idler roller substantially entirely of wrought steel including taking a piece of wrought steel cylindrical tubing of generally uniform cylindrical shape and of desired length and successively heating each end, forming a rough outline of a head on each end by forcing each free end of said tubing while rotating into a non-rotary forming die while said free end is hot, deflecting each end portion of said tubing by said die to bend it into a head with a curved periphery adjacent the adjoining cylindrical body of the roller, and forming a cylindrical portion along the axial center line of the tubular roller body which cylindrical portion forms a bearing receiving cup having a female cylindrical surface concentric with and radially and axially inside the radial and axial dimensions of said tubular roller body and having a free edge on its axially inner end, and thereafter forming each said head by simultaneously forging a concave portion adjacent the curved peripheral portion, reducing the thickness of the above mentioned cylindrical portion, and enlarging the end portion, thereby forming at each end a concave head with a smooth outer curve at the periphery of each bell connecting it to an adjacent cylindrical portion of the roller.

WALTER C. STEINMETZ.

REFERENCES CITED

The following references are of record in the file of this patent:

UNITED STATES PATENTS

| Number | Name | Date |
| --- | --- | --- |
| Re. 22,465 | Hill | Apr. 4, 1944 |
| 1,742,454 | Van Derhoef | Jan. 7, 1930 |
| 1,919,495 | Allen | July 25, 1933 |
| 1,990,805 | Watson | Feb. 12, 1935 |
| 1,990,806 | Watson | Feb. 12, 1935 |
| 2,007,910 | Stephens | July 9, 1935 |
| 2,030,818 | Harter | Feb. 11, 1936 |
| 2,309,561 | Weston | Jan. 26, 1943 |
| 2,410,813 | Dillon | Nov. 12, 1946 |